Patented Sept. 11, 1923.

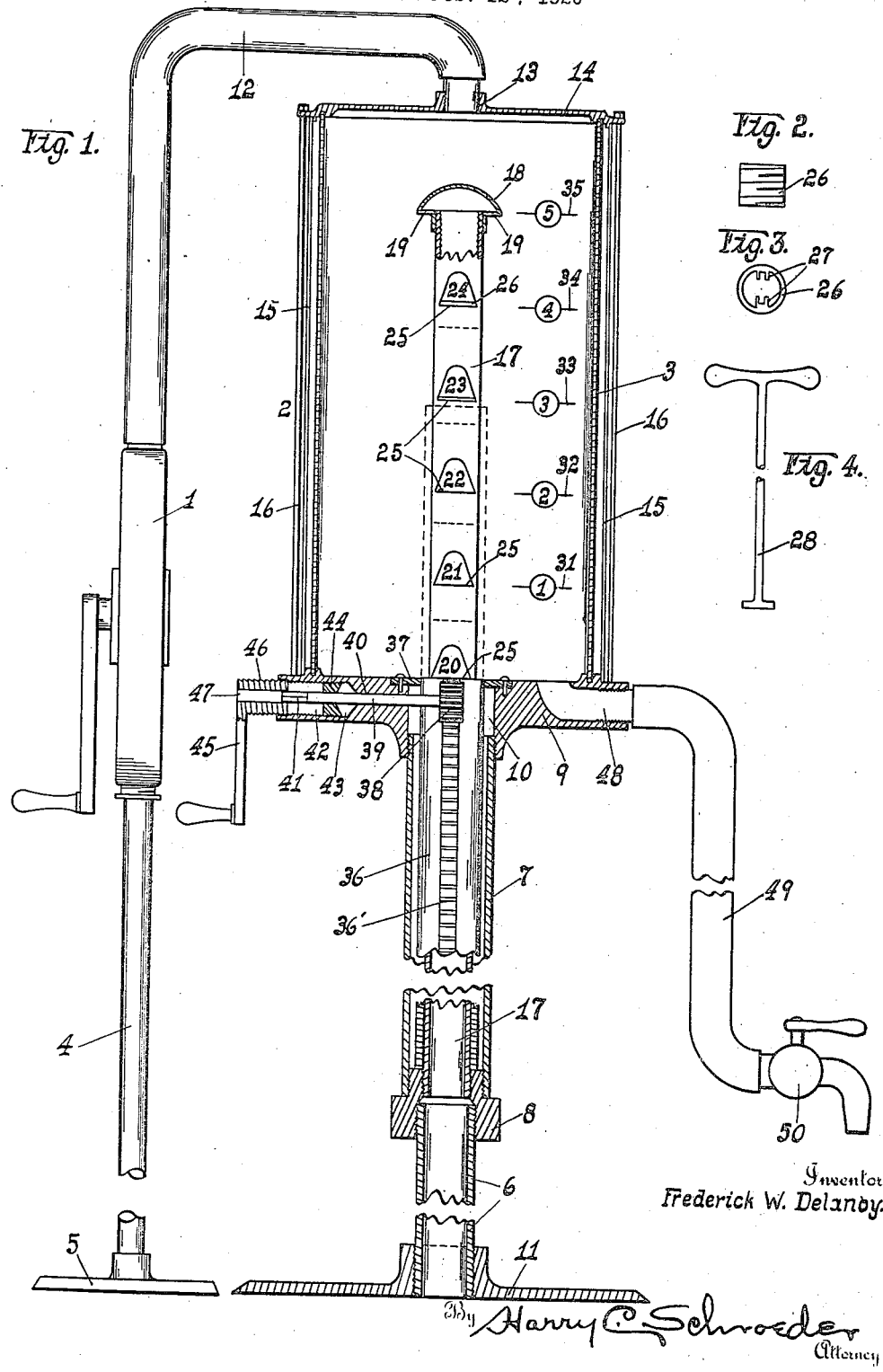

1,467,425

UNITED STATES PATENT OFFICE.

FREDERICK WILLIAM DELANOY, OF ALAMEDA, CALIFORNIA.

LIQUID MEASURING AND DISPENSING APPARATUS.

Application filed February 12, 1920. Serial No. 358,186.

*To all whom it may concern:*

Be it known that I, FREDERICK WILLIAM DELANOY, a citizen of the United States, residing at Alameda, in the county of Alameda and State of California, have invented certain new and useful Improvements in Liquid Measuring and Dispensing Apparatus, of which the following is a specification.

My invention is a visible liquid measuring and dispensing apparatus, particularly useful for automobile oil stations.

Referring to the annexed drawing, forming a part of this specification in which the reference characters of the specification indicate the corresponding parts:

Figure 1 is a longitudinal vertical section of my invention.

Figure 2 is a side view of a measure outlet adjusting sleeve.

Figure 3 is a plan of said sleeve.

Figure 4 is a side view of the wrench for turning said sleeve.

In the drawing 1 indicates a standard crank pump and 2 a measuring container having a cylindrical transparent wall 3. The pump 1 is mounted on an inlet pipe 4 mounted in a base 5 and communicating at its lower end with the oil reservoir of an automobile oil station. The measuring container 2 is mounted upon a vertical pipe 6 by means of a sleeve 7 and a union 8 which screws onto the upper end of pipe 6 and into the lower end of said sleeve, the upper end of said sleeve screwing into the lower head 9 of the measuring cylinder in a central opening 10 in said head. The pipe 6 screws into a base 11 and communicates at its lower end with the oil reservoir. A pipe 12 leads from the outlet of pump 1 into the top of container 2 through an inlet 13 in the center of the upper head 14 of the cylinder. A metal mesh 15 surrounds the cylinder wall 3 protecting said wall. Tie rods 16 hold the heads 9 and 14 on the cylinder wall 3. An overflow pipe 17 is screwed at its lower end into the union 8 and extends upwardly through sleeve 7 into the container 2 nearly to the top thereof under the inlet 12. A mushroom head 18 screws on the upper end of the overflow pipe 17, said head being provided with ports 19 in its under side. The overflow pipe 17 is provided with a series of overflow measuring openings 20, 21, 22, 23 and 24 arranged one above the other, having lower straight horizontal edges 25, the lower edge of the lowermost port 20 coinciding with the inner surface of the head 9 or the bottom of the cylinder. Measure adjusting sleeves 26 screw into the overflow pipe 17, which is internally threaded, said sleeve having internal notched lugs 27 into which is inserted a wrench 28 for turning the sleeves to screw them into the pipe so as to adjust their upper edges in the overflow openings 20 to 24 respectively to the proper measuring levels. Horizontal measuring marks 31, 32, 33, 34 and 35 are placed on the cylinder wall 3 at the right of the overflow ports 21, 22, 23, 24 and 19 respectively, and in alignment with the lower edges of said openings or the upper edges of sleeves 26, said marks indicating respectively the levels of one, two, three, four and five gallons of oil in the container 2. A vertical measuring sleeve 36 is slidably mounted on the overflow pipe 17 within the sleeve 7, and extends through a collar 37 screwed to the bottom of the container 2 or inner surface of the lower head 9, said collar closing the opening 10 around said sleeve. A vertical rack 36' is secured to the outside of sleeve 36, which rack meshes with a pinion 38 secured on the inner end of a shaft 39 journaled horizontally in the head 9 in a bearing 40. The shaft 39 has an outer squared end 41 extending into an internally threaded bore 42 in the periphery of the head 9. A packing 43 is placed in the inner end of the bore 42 around the shaft 39 and a packing head 44 screws into said packing, thus preventing leakage around shaft 39. A crank 45 has an externally threaded hub 46 which screws into the internally threaded bore 42 and has a squared opening 47 into which fits the squared end of shaft 39. In the lower head 9 is an outlet 48 from which leads a hose 49 on the outer end of which is a valve 50. When the oil is pumped into the container 2 the customer may see through the transparent wall 3 that he gets proper measure by reading the level of the oil with the marks 31, 32, 33, 34 or 35. If the customer wants one, two, three, four or five gallons of the oil, the operator turns the crank 45, and raises the sleeve 36 through the medium of the shaft 39, pinion 38 and rack 37, until the upper end of the measuring sleeve 36 coincides with the lower edge of the ports 21, 22, 23, 24 or 25 or with the upper edge of the sleeves 26 in said openings. The valve 50 being closed, oil is then pumped by pump 1 into the cylinder until it reaches the one, two, three, four or five gallon mark; any surplus oil flowing out of the port 21, 22, 23, 24 or 19 according to the measure of oil desired. The customer seeing the desired measure of oil in the container 2 opens the valve 50 and delivers the same into his automobile tank. When the measuring sleeve 36 is down in its lowermost position, the backward rotation of the crank 45 will have caused the hub thread to disengage the end of the thread in bore 42 so that the crank may be removed. The crank is removed at the end of each day. My apparatus cannot be operated or manipulated by the operator to give short measure.

Having described my invention, I claim:

1. In an apparatus of the character disclosed, a measuring container including a transparent wall, means for pumping liquid into said container, an overflow pipe in said container having overflow ports at various levels corresponding to various measures, means for covering said ports to measure various quantities of liquid, measure adjusting sleeves screwed into said overflow pipe for adjusting the height of the lower edge of said measuring ports, and means for delivering the measured liquid from said container.

2. In an apparatus of the character disclosed, a measuring container including a transparent wall, means for filling said container, an overflow pipe in said container having overflow ports at various levels corresponding to various measures, means for covering said ports to measure various quantities of liquid, measure adjusting sleeves screwed into said overflow pipe for adjusting the height of the lower edge of said measuring ports, and means for delivering the measured liquid from said container.

In testimony whereof I affix my signature.

FREDERICK WILLIAM DELANOY.